United States Patent [19]

Stadnick et al.

[11] Patent Number: 5,283,512
[45] Date of Patent: Feb. 1, 1994

[54] CHARGE BALANCING OF BATTERIES DURING CHARGING

[75] Inventors: Steven J. Stadnick, Lakewood; Robert K. Taenaka, Granada Hills, both of Calif.

[73] Assignee: Hughes Aircraft Company, Los Angeles, Calif.

[21] Appl. No.: 867,578

[22] Filed: Apr. 13, 1992

[51] Int. Cl.[5] ............................................. H02J 7/04
[52] U.S. Cl. ......................................... 320/18; 320/6
[58] Field of Search ...................... 320/5, 6, 14, 15, 17, 320/18

[56] References Cited

U.S. PATENT DOCUMENTS

| | | | |
|---|---|---|---|
| 3,765,945 | 10/1973 | Sudworth | 136/83 R |
| 4,226,923 | 10/1980 | Mikkor | 429/104 |
| 4,238,721 | 12/1980 | DeLuca et al. | 320/18 |
| 4,303,877 | 12/1981 | Meinhold | 320/6 |
| 4,614,905 | 9/1986 | Petersson et al. | 320/18 |
| 4,719,401 | 1/1988 | Altmejd | 320/13 |
| 5,063,340 | 11/1991 | Kalenowsky | 320/18 X |

*Primary Examiner*—Kristine L. Peckman
*Attorney, Agent, or Firm*—Georgann S. Grunebach; Terje Gudmestad; W. K. Denson-Low

[57] ABSTRACT

A battery system comprises a plurality of sodium-sulfur storage cells connected in series to form a battery, with voltage measurement leads attached across each of the individual storage cells. A charge-limiting circuit controllably isolates an individual storage cell from a charging current applied across the battery when the measured voltage across that individual storage cell exceeds a preselected maximum storage cell voltage. Preferably, the charge-limiting circuit includes a bypass circuit connected through the voltage measurement leads and a circuit element that becomes conductive when the voltage across the individual storage cell exceeds the preselected maximum storage cell voltage. There are a plurality of charge-limiting circuits, one for each of the storage cells of the battery. In operation, a high charging current is imposed on the battery while measuring the voltage across each individual storage cell, until the voltage measured across at least one of the storage cells exceeds a preselected reduced-current voltage that is less than the preselected maximum storage cell voltage. The charging current is thereafter reduced to a low charging current while continuing to charge the battery. The low charging current is bypassed around each of the individual storage cells as that storage cell reaches the maximum voltage, until all of the storage cells reach the same state of charge.

6 Claims, 2 Drawing Sheets

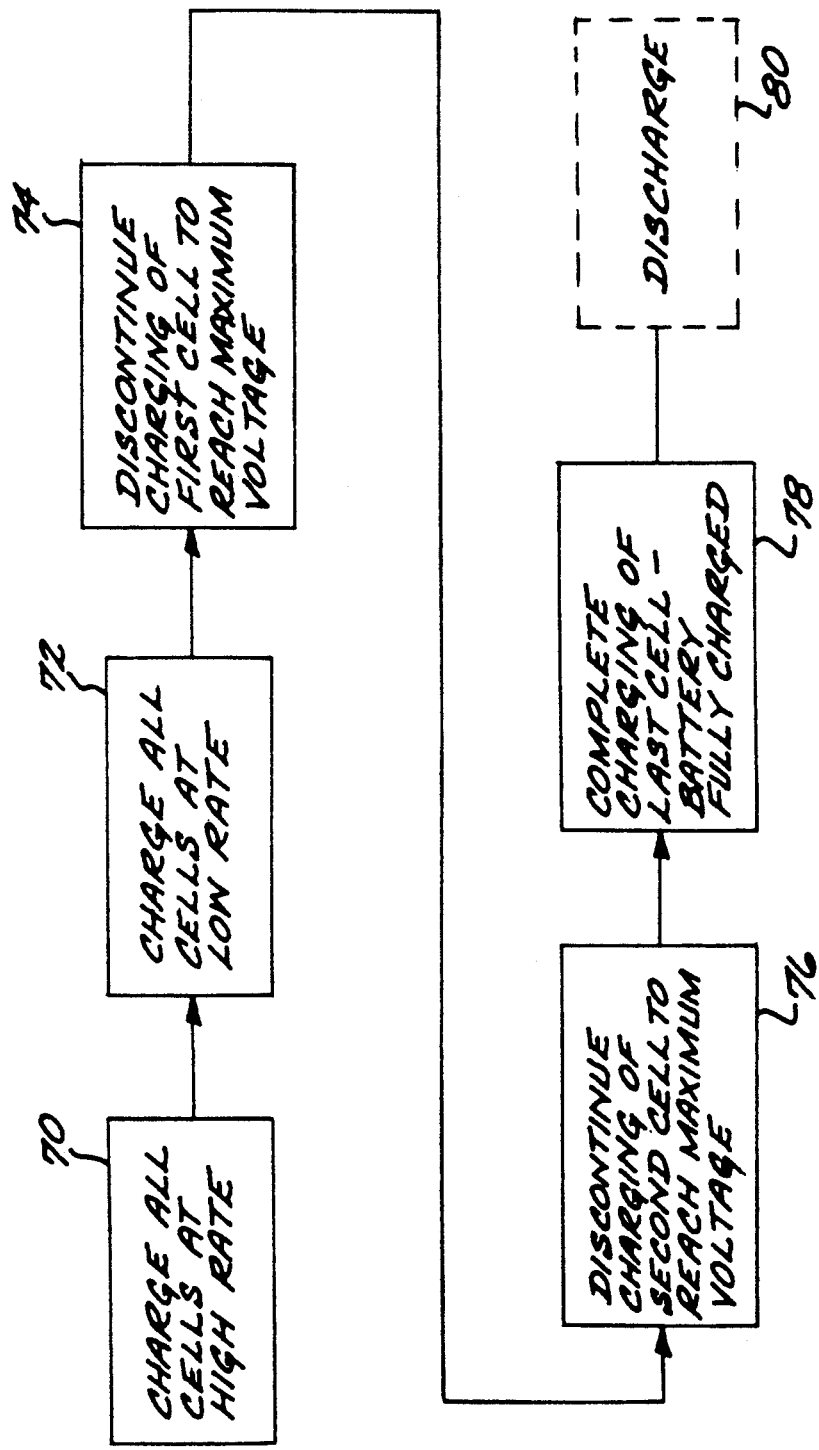

CHARGE BALANCING OF BATTERIES DURING CHARGING

BACKGROUND OF THE INVENTION

This invention relates to controlling the charging of electrical storage batteries, and, more particularly, to attaining optimal charging of sodium-sulfur batteries having multiple storage cells.

Rechargeable storage cells are electrochemical devices for storing and retaining an electrical charge and later delivering that charge as useful power. A number of such storage cells are typically connected together electrically to form a battery having specific voltage or current delivery capability. Familiar examples of the rechargeable storage cell are the lead-acid storage cell used in automobiles and the nickel-cadmium storage cell used in portable electronic devices such as cameras. Another type of storage cell having a greater storage capacity for its weight is the nickel oxide pressurized hydrogen cell, an important type of which is commonly called the nickel-hydrogen cell and is used in spacecraft applications.

Yet another type of storage cell is the sodium-sulfur storage cell, which has been under development for over 20 years for use in a variety of terrestrial applications such as nonpolluting electric vehicles. The sodium-sulfur storage cell has the particular advantage that its storage capacity per unit weight of storage cell is several times the storage capacity of the nickel-hydrogen cell. The sodium-sulfur storage cell therefore is an attractive candidate for use in spacecraft applications as well as automotive applications.

The most common type of construction for a sodium sulfur storage cell includes a cylindrical metal outer housing which serves as a positive terminal and a cylindrical shell of an alumina-based ceramic within the outer housing. Sodium is placed into a first or inner chamber formed within the alumina shell, and sulfur is placed into a second chamber formed between the alumina shell and the outer housing. The storage cell is heated to a temperature of about 350 C., at which temperature both the sodium and the sulfur are molten. The liquid sodium is the anode of the storage cell, the liquid sulfur is the cathode, and the solid ceramic is the electrolyte. Electrical energy is released when sodium ions diffuse through the ceramic into the sulfur, thereby forming sodium polysulfides. Electrical energy can be stored when the process is reversed during charging of the battery, with an applied voltage causing the sodium polysulfides to decompose to yield sodium and sulfur, and the sodium ions diffuse through the ceramic electrolyte back into the first chamber.

It is observed in some tests of batteries made from a number of individual sodium-sulfur storage cells connected in series that the usable electrical storage capacity of the battery may be less than expected, and may deteriorate even further after repeated cycles of charging and discharging. This reduced storage capacity must be considered in designing the battery and assessing the total battery capacity required to provide sufficient storage capacity for a particular mission. Since the sodium-sulfur battery may be required to operate for 10–20 years, even very gradual reductions in storage capacity may have a marked adverse impact on spacecraft design by adding considerable battery weight, because the battery must be designed to meet the performance requirements at the end as well as the beginning of the mission.

There is a need for an improved sodium-sulfur storage battery which has the expected storage capacity and retains that storage capacity over extended periods of time. The present invention fulfills this need, and further provides related advantages.

SUMMARY OF THE INVENTION

The present invention provides a storage battery system that has the electrical energy storage capacity predicted from the storage capacities of the individual storage cells. The high storage capacity is retained over extended periods of time and numbers of charge/discharge cycles. The battery system of the invention is only marginally more heavy than a conventional battery, and does not have a higher heat loss rate.

In accordance with the invention, a battery system comprises a plurality of storage cells connected together to form a battery, and means for imposing a charging current on at least some of the storage cells. There is further provided means for automatically selecting the storage cells to which the charging current is to be applied. The means for selecting operates responsive to the state of charge of at least one of the storage cells. The means for automatically selecting preferably includes a bypass circuit that bypasses the charging current around a particular storage cell when a voltage measured across that particular storage cell exceeds a preselected maximum storage cell voltage.

In one embodiment, a battery system comprises a plurality of storage cells connected in series to form a battery, charging leads connected across the battery whereby a charging current is imposed on the battery, and means for controllably bypassing the charging current around at least one of the storage cells. In the usual case, the means for controllably bypassing includes a plurality of bypass circuits, one for each of the storage cells. In the currently most significant embodiment, the storage cells are sodium-sulfur storage cells.

The work leading to the present invention demonstrated that the reason for the reduced storage capacity of sodium-sulfur batteries as compared to the expected storage capacity is related to the failure to equalize the charging of the individual storage cells that make up the battery. To make most efficient use of the battery, it is fully charged during charging and deeply discharged during discharging. Upon charging, each storage cell should be fully charged, and then equally discharged during discharging. Unfortunately, this uniform behavior cannot normally be achieved, for the following reasons.

The individual storage cells have a high coulombic efficiency and an inherently poor tolerance to overcharging. Small differences in charge acceptance, self-discharge rate, and low-current drain paths within the battery can build over time, resulting in an inability of the battery storage cells to remain balanced toward the end of the battery life. That is, because no one storage cell of the battery can be overcharged, in conventional practice the charging must be discontinued when any one of the storage cells reaches its storage capacity. Due to the small variations between the storage cells, others of the storage cells will not be fully charged at this point, and therefore the battery can accept a maximum charge that is less than expected. These imbalances are accentuated over the life of the battery, so that the maximum storage capacity of the battery is increasingly reduced as compared with the sum of the storage capacities of the individual storage cells. In a similar fashion, the individual storage cells are intolerant to overdischarging, and the discharging of the battery is limited by the first of the storage cells to reach its discharge limit. The discharge imbalance increases over time by a similar mechanism. Thus, the limits of operation of the battery between maximum charge and maximum discharge gradually are reduced. Many types of storage cells do not exhibit this type of imbalance, and have internal self-regulating features that permit them to operate without reduced limits of operation.

The present invention solves this problem by providing regulating circuitry for the battery to ensure that each storage cell reaches its full charge during charging and is therefore discharged to about the same level during discharging. This regulating circuitry does not change with time, and there is no reduction in operating limits of the battery over time and many charge/discharge cycles. The regulating circuitry operates automatically on every cycle as required.

In the preferred approach, a number of sodium-sulfur storage cells are connected in series to form the battery. Charging is accomplished by imposing a charging current, available from an external source such as a solar cell array on a spacecraft, across the battery and thence across the plurality of storage cells. The charging current is a high-rate charging current of, for example, about 2-40 amperes for a cell rated at 40 ampere-hours. The degree of charge is determined by measuring the voltage across the storage cell. When any one of the storage cells reaches a state of charge that approaches the maximum charge, as indicated by measurement of a preselected voltage for that storage cell, termed the reduced-current voltage, the charging mode is changed to a lower-current mode termed a trickle charge that is typically about 100 milliamperes.

Charging continues at the trickle charge rate. As the degree of charge of each storage cell reaches the maximum permissible storage level, as indicated by its reaching a preselected maximum voltage across each individual storage cell, a charge-limiting circuit activates to prevent that particular storage cell from overcharging. In the preferred approach, the charge-limiting circuit is a bypass circuit that shunts the trickle charging current around the storage cell whose maximum charge has been reached. The bypass circuit preferably achieves the shunt through the voltage measurement leads, which are relatively fine wires, to avoid the need for an additional set of bypass leads that would provide a heat-flow leakage path out of the storage cell.

A bypass charge-limiting circuit is provided for each of the storage cells in the battery, so that they sequentially are removed from the charging circuit as they become fully charged. When all of the storage cells become fully charged to the same preselected voltage, the battery is fully charged with the state of energy storage of all of the storage cells the same. During discharge, the individual cells therefore discharge to about the same level. Upon recharging, the charge-limiting approach just discussed again functions, so that a uniform state of charge is achieved even though there may have been minor differences in the discharge state. The battery must therefore be designed only to account for minor variations between storage cells during a single discharge cycle, not for differences that might otherwise accumulate over many cycles.

There is further provided a permanent bypass circuit that, after closure of a permanent bypass switch, permanently isolates and removes the storage cell from the battery. The permanent bypass circuit is operated in the event that the storage cell fails in the open circuit state.

The present invention provides an important advance in the art of high-performance batteries, particularly sodium-sulfur batteries. Uniform charging and nearly uniform discharging are achieved and maintained over a long battery life and many charge/discharge cycles. The designer need not be concerned with reduced storage capacity of the battery that might otherwise occur over time due to charge imbalance. Other features and advantages of the invention will be apparent from the following more detailed description of the preferred embodiments, taken in conjunction with the accompanying drawings, which illustrate, by way of example, the principles of the invention.

BRIEF DESCRIPTION OF THE DRAWINGS

FIG. 2 is a process block diagram for charging of the battery system of FIG. 1.

DETAILED DESCRIPTION OF THE INVENTION

Figure 1:
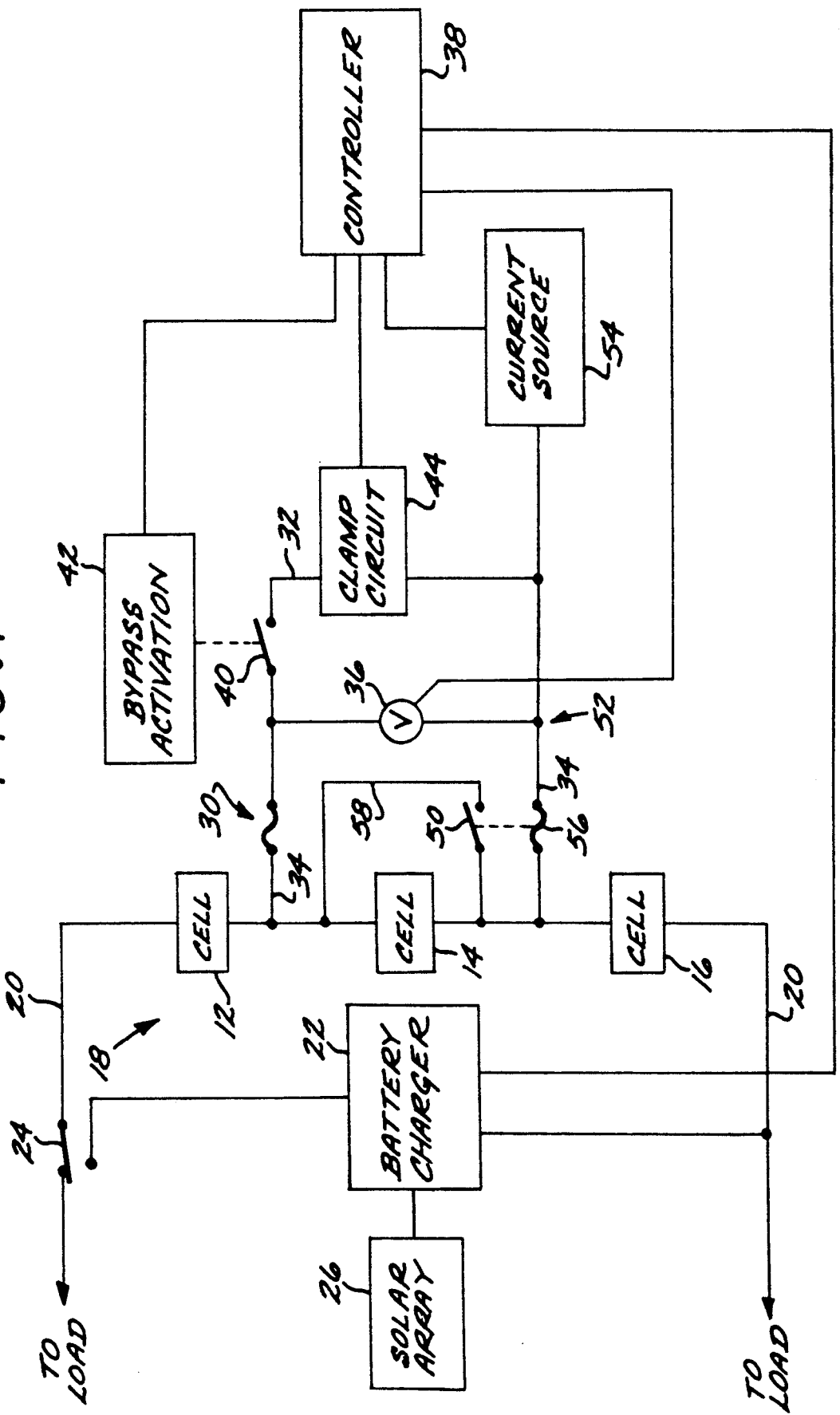
FIG. 1 is a circuit diagram of a sodium-sulfur battery system.

FIG. 1 depicts a battery system 10 according to the present invention. The battery system 10 includes three individual sodium-sulfur electrochemical storage cells 12, 14, and 16. In normal practice, there would be more storage cells in a battery system, typically on the order of about 16-64 storage cells, but only three are depicted for ease of illustration. The storage cells 12, 14, and 16 are connected in series to form a battery 18, whose delivered output voltage is the sum of that of the three storage cells 12, 14, and 16. Design and construction of the sodium-sulfur electrochemical storage cells themselves are well known in the art, see for example U.S. Pat. Nos. 3,765,945 and 4,226,923, whose disclosures are incorporated by reference.

The battery 18 is charged and discharged through a pair of leads 20 connected to the terminals of the outermost of the storage cells connected in series, here the storage cells 12 and 16. The present invention is concerned with the charging of the battery 18. A battery charger 22 is connected to the leads 20 through a switch 24 that is closed during charging and opened during discharging of the battery 18. The battery charger 22 supplies a controllably constant current flow to charge the battery 18 and the respective storage cells 12, 14, and 16. Electrical energy is supplied to the battery charger 22 by any appropriate source of charge, in the preferred case a solar cell array 26.

A particular characteristic of sodium-sulfur storage cells is that there is no self-regulating internal chemical reaction that permits an individual storage cell to be overcharged or overdischarged without damage to the storage cell itself. For example, if a sodium-sulfur storage cell is charged to an open circuit potential greater than a voltage characteristic of the storage cell, irreparable damage to the storage cell may result. This characteristic leads to the possibility of charge imbalance of a battery containing a number of sodium-sulfur storage cells. If one of the storage cells charges to a greater voltage than the others, and charging is continued to bring the other storage cells to their full charge, the overcharged storage cell may be damaged and cannot be repaired. Unfortunately, the charge imbalances that can lead to such problems tend to accumulate with increasing numbers of charge/discharge cycles, and may become apparent only after hundreds or thousands of cycles.

To solve this problem, the battery system 10 of the present invention includes charge limiting circuitry 30. In its preferred form, the charge limiting circuitry 30 includes a bypass circuit 32 that shunts the charging current around each individual storage cell as that storage cell reaches its maximum stored charge and thence its maximum permissible voltage. Each storage cell has its own bypass circuit 32. Here only the bypass circuit 32 for the storage cell 14 will be discussed, with the understanding that the bypass circuits for the other storage cells are substantially identical.

The bypass circuit 32 is connected to the storage cell 14 through leads 34 that must be of sufficient diameter to carry the shunted charging current that is experienced during that portion of the charging cycle when the bypass circuit 32 may be operational. The battery charger 22 is operated in such a manner that the charging current at this point of the charging cycle is a relatively small trickle charge of about 100 milliamperes (0.1 amperes), and the details of this approach will be described subsequently. By utilizing a small trickle charging current, the leads 34 may be made quite small in diameter. Preferably, the leads 34 are 20 gauge copper wire, and are the same leads that are used by a voltmeter (to be described) that measures the voltage of each individual storage cell. The use of small-diameter leads 34, and avoiding the use of multiple leads, is highly desirable to avoid a heat-loss path from the storage cells, which operate at temperatures of about 350 C.

The bypass circuit 32 is preferably provided with doubly redundant active circuit components, to guard against the possibility of a system failure during an extended operating life. These doubly redundant components are usually operated in parallel unless one fails. In FIG. 1, only a single one of the bypass circuits 32 is illustrated.

The state of charge of each storage cell is individually monitored by a voltmeter 36 attached to the terminals of the storage cell 14 through the same leads 34 used to attach the bypass circuit 32 to the storage cell. The reading of each voltmeter 36 is supplied to a controller 38, which controls the operation of the battery charger 22, the bypass circuit 32, and a permanent bypass switch (to be discussed subsequently).

The bypass circuit 32 includes a bypass switch 40 that is activated by a bypass activator 42, whose operation is controlled by the controller 38. The bypass circuit 32 and switch 40 are controllably latched closed by a clamping circuit 44, also controlled by the controller 38. When the bypass switch 40 is open, charging current passes through the cell 14. When the bypass switch 40 is closed, charging current is shunted around the cell 14 through the bypass circuit 32, which connects to the terminals of the cell 14 through the fine-wire leads 34.

The operation of the controller 38 is illustrated in the flow chart of FIG. 2. During a charging cycle with the switch 24 closed, the battery charger 22 initially supplies a high charging current of, for example, about 2-40 amperes for a battery rated at 40 ampere-hours to charge the battery 18 from its discharged state to nearly the fully charged state, numeral 70. The voltage initially measured by each voltmeter 36 during the charging process is relatively low, and gradually increases to reflect the accumulation of charge within each storage cell. However, the voltages of the individual storage cells are not necessarily precisely the same, and typically vary from storage cell to storage cell due to differences in design, leakage paths, different initial states of discharge, and other reasons.

When any one of the storage cells 12, 14, or 16 reaches a preselected reduced-current voltage, which is preferably 2.5 volts as indicated on its voltmeter, the controller 38 sends a command to the battery charger 22 to reduce the current from the initial high charging current to a low charging current (trickle current) that is preferably about 100 milliamperes. The charging current is reduced to the lower value, and the charging of the storage cells 12, 14, and 16 continues at a lower rate, see numeral 72. This change from a high charging current to a low charging current is not necessary for the bypass circuit to operate in a general sense, although it is necessary for the illustrated preferred case where the fine diameter leads 34 are used to minimize thermal loss from the storage cells. The fine diameter leads 34 could not carry the high charging current, and therefore the reduction to the lower charging current is required.

After the lower charging current is stabilized, the controller 38 operates each of the bypass circuits 32 for the storage cells in turn, as that respective cell reaches its maximum charge. As charging continues at the low charging rate produced by the low charging current, eventually a first one of the cells 12, 14, or 16 reaches a preselected maximum storage cell voltage, which is typically on the order of about 2.7 volts. This maximum storage cell voltage reflects the maximum state of charge of the storage cell. At that point, the bypass circuit for that storage cell is operated by the controller 38 in the manner discussed. Operation of the bypass circuit for a particular storage cell shunts further charging current around that storage cell, temporarily (during the charging cycle underway) removing that storage cell from the charging circuit numeral 74. The charging of the remaining storage cells continues. Later, a second one of the remaining on-line storage cells reaches the maximum storage cell voltage, and its shunt circuit operates to shunt the charging current around that storage cell, numeral 76.

The sequential removal from the charging circuit of the storage cells that reach the maximum storage cell voltage continues until the last storage cell is fully charged, numeral 78. The switch 24 is then opened by the controller 38, and the storage cell is ready for the discharge portion of the cycle, numeral 80. If desired, the charging of the storage cells may be discontinued prior to all of the storage cells reaching their full charge by opening the switch 24. After the charging is complete, the controller 38 continues to monitor the state of charge of the storage cells with the voltmeters 36, and can resume charging if for any reason there is a reduction in the charge level of any of the storage cells, as measured by its voltage, and the source of current 26 is still available (i.e., the spacecraft has not moved into darkness).

This approach provides that all of the storage cells of the battery commence the discharge process from the same state of charge, on each charge/discharge cycle. The circuit does not mandate that each of the storage cells be discharged to precisely the same state, but does ensure that, on the next cycle, the individual storage cells will again be charged to the same initial state prior to discharge. Thus, small variations between the discharging of the storage cells may be observed in any one cycle, but those small variations cannot accumulate from cycle to cycle, resulting in a cumulative degradation of the capacity of the battery over time and numbers of cycles.

The battery system 10 also provides that individual storage cells can be permanently isolated and removed from the battery in the event of open circuit failure or abnormal behavior of that storage cell. This capability is desirable because life studies of storage cells demonstrate that, statistically, some number will become inoperable during any particular mission for various reasons. The battery is usually overdesigned, with more storage cells than necessary connected in series, to permit the battery to continue to function by delivering the required output voltage, even when the expected number of storage cells have failed and been electrically isolated from the battery.

The permanent isolation of an individual storage cell is accomplished by the permanent closing of a permanent bypass switch 50 that shunts the charging and discharging currents around the cell 14. Upon activation of a permanent bypass circuit 52, the bypass switch 50 is permanently closed, shunting the charging and discharging currents around the cell 14.

Any operable permanent switch closing arrangement may be used, but the following approach has been selected to minimize the weight associated with the circuitry. The closing circuit 52 is operated by the controller 38 when the voltage measured on the storage cell 14 exceeds the preselected maximum charging voltage, typically about 2.7 volts. The permanent bypass switch 50 is permanently frozen in the closed position by passing a high current from a current source 54 through a fusible element 56 in the bypass switch 50. The fusible element 56 melts, closing the permanent bypass switch 50 and preventing its subsequent reopening. The permanent bypass switch 50 shunts the full charging and discharging current of the battery 18 around the individual storage cell 14 through heavy leads 58. Operation of the permanent bypass switch 50 by melting of the fusible element 56 also isolates the bypass circuit 32, which would not be again needed, from the current flow so that a high current could not be inadvertently passed through the bypass circuit 32.

The present approach provides an advance in the art of batteries made of storage cells that do not have inherent electrochemical charge-limiting mechanisms. Although particular embodiments of the invention have been described in detail for purposes of illustration, various modifications may be made without departing from the spirit and scope of the invention. Accordingly, the invention is not to be limited except as by the appended claims.

What is claimed is:

1. A battery system, comprising:
    a plurality of storage cells connected together to form a battery;
    means for imposing a charging current on at least some of the storage cells;
    means for automatically selecting the storage cells to which the charging current is to be applied, wherein the means for selecting operates responsive to the state of charge of at least one of the storage cells; and
    means for permanently electrically isolating one of said storage cells from the battery, the means for permanently isolating including a permanent bypass switch and a fusible element that maintains the switch in the bypass position when activated.

2. The battery system of claim 1, wherein the storage cells are sodium-sulfur storage cells.

3. The battery system of claim 1, wherein the storage cells are connected in series.

4. The battery system of claim 1, wherein the means for imposing a charging current includes a current source.

5. The battery system of claim 1, wherein the means for automatically selecting includes a bypass circuit that bypasses the charging current around one of said storage cells when a voltage measured across said one of said storage cells exceeds a preselected maximum storage cell voltage.

6. The battery system of claim 5, wherein the means for automatically selecting includes a plurality of bypass circuits, one for each of the storage cells.

* * * * *